Patented Jan. 3, 1950

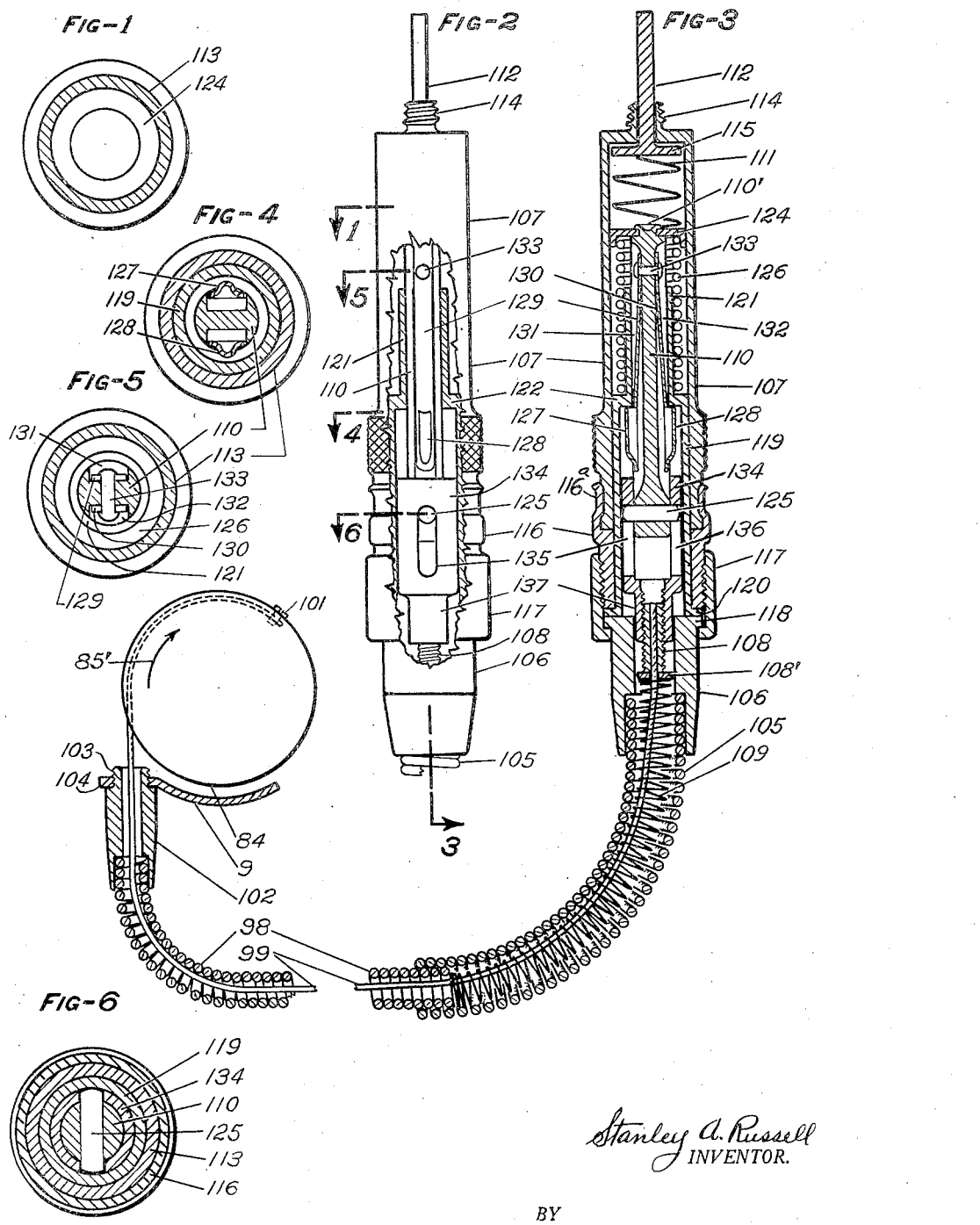

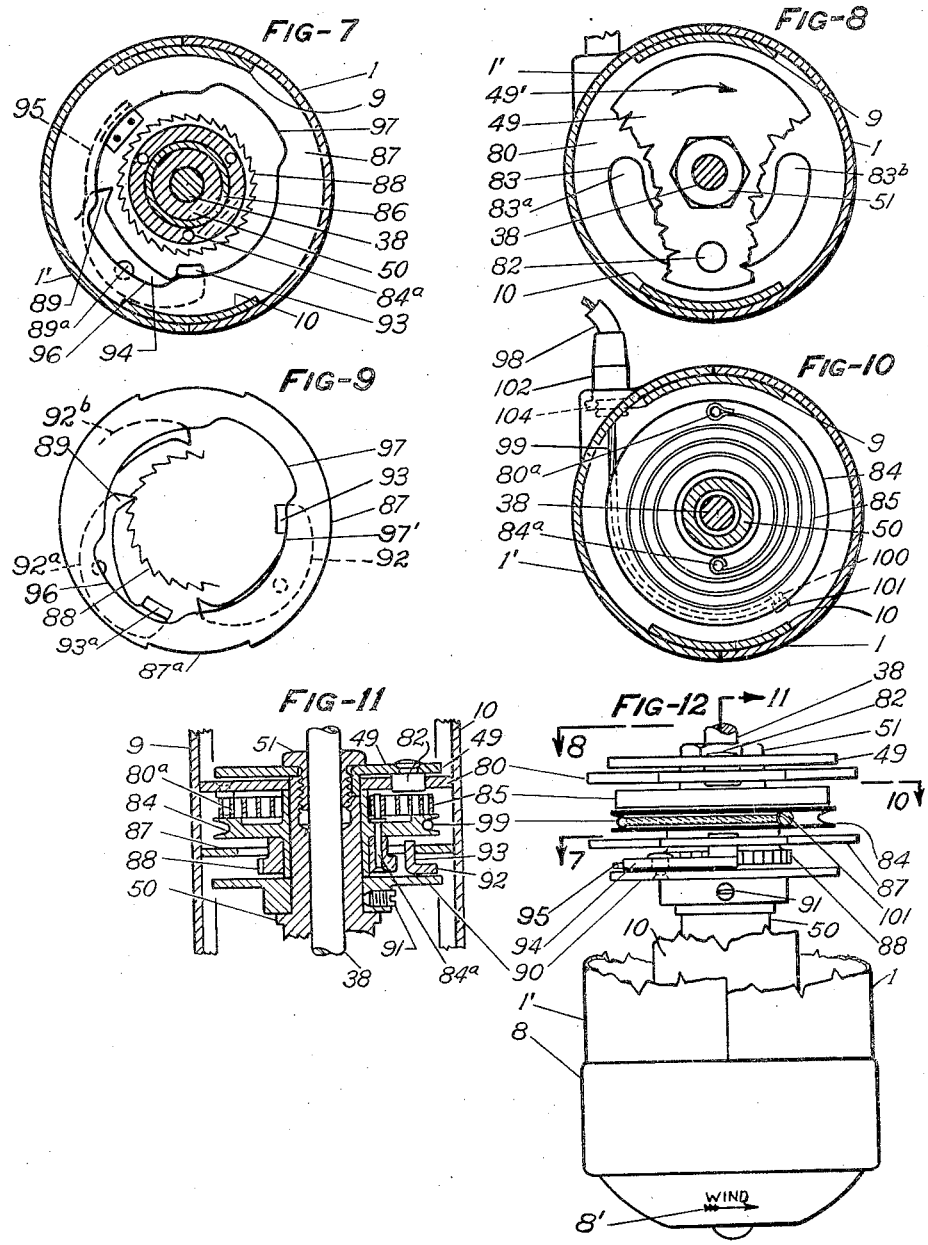

2,493,728

UNITED STATES PATENT OFFICE 2,493,728

CABLE RELEASE FOR CAMERA SHUTTERS

Stanley A. Russell, Baldwin, N. Y., assignor of one-third to Walter A. Campbell, Valatie, N. Y.

Application May 2, 1947, Serial No. 745,525

8 Claims. (Cl. 74—502)

The invention comprehends a cable release for actuating the shutter of a camera.

An object of the invention is to provide a cable-release actuating mechanism that is actuated in timed relation to the actuation of a generator and which is adjustable to secure the proper synchronization of the energization of a photographic flash bulb and the actuation of the shutter of a camera. An additional object of the invention is to provide a cable release in which the action of the cable is constant in operation regardless of the curvature thereof. Another object of the invention is to provide a cable release which acts on the shutter of a camera through a shock absorbing arrangement.

The foregoing objects and certain advantages of the invention that will hereinafter appear are realized in the embodiment of the invention illustrated in the accompanying drawings and described in detail below, from which description a clearer understanding of the invention may be had.

The drawings include:

Figures 1, 4, 5, and 6 constitute transverse sections respectively on lines 1, 4, 5 and 6 of Figure 2.

Figure 2 shows a front elevation of the fitting on the camera end of the self-compensating cable, the housing or shell being broken away revealing part of the interior construction.

Figure 3 is a longitudinal section taken approximately on line 3, Fig. 2.

Figures 7, 8 and 10 are transverse sections taken respectively on lines 7, 8 and 10 of Fig. 12.

Figure 9 is a fragmentary diagrammatical view showing the relation of the pawl 94 to the ratchet 88 during one cycle of its operation.

Figure 11 is a longitudinal section taken approximately on line 11 of Fig. 12, showing in detail the relation of the clutch end of the self-compensating cable to that part of the flash gun mechanism which operates it.

Figure 12 is a fragmentary elevation of a flash gun housing on which the clutch end of the self-compensating cable is mounted for operation in conjunction with the flash gun.

The casing or housing is made up of fitting 107 over which coupling fitting 116 is spun as shown at 116a in such manner that fitting 107 can be screwed into the camera shutter without turning the fitting 116. The upper portion of sheathing 105 is permanently attached to nipple 106 which in turn is connected to fitting 116 by the coupling 117. The smaller sheathing 98 is permanently attached to larger sheathing 105 and to the nipple 102 in the manner shown in Fig. 3. Within the assembled casing is located the rod 110 which is preferably cylindrical and is provided with diametrically opposed slots 131 and 132. Springs 129 and 130 of flat strip stock are riveted to rod 110 with rivet 133. The free ends of these springs are provided with lateral projections 127 and 128 extending outwardly therefrom and are adapted to releasably engage co-operating shoulder portions of the tube 121 at location 122. When the springs are pressed flat against the bottom of the slots 131 and 132 the lateral projections are within the diameter of rod 110 and will slide down the tube 121. The tension of these springs is such as to bias the lateral projections out of the slots 131 and 132. The inner tube or casing 119, 121 and 122 is clamped in the position shown, that is, between the threaded end of fitting 116 and the flange 118 of the nipple 106 by the flanged nut 117. The rod 110 is slidable within the small end of tube 121. The apertured flanged disk is slidable within tube 107 and is riveted to rod 110 as indicated at 110'. This flanged disk retains the helical spring 126 adjacent the rod 110. This spring exerts its thrust against the disk 124 and shoulder 122. It can now be seen that if the rod 110 is pushed in against the thrust of spring 126 to the position shown in Fig. 3 that the lateral projections 127 and 128 will move outwardly and engage the shoulder 122 thereby locking the rod 110 in the position shown.

The threaded piece 108 is permanently attached to the strand or cable 99 and serves to connect the cable to the release plunger 134 and 137. This release plunger slides freely within the inner diameter of tube 119 and also over rod 110. The pin 125 extends through rod 110 and into elongated slots 135 and 136 of the plunger 134. The slidable pin 112 slides freely in the threaded tip 114 and is provided with a head 115. The spring 111 exerts a light thrust on the head 115 sufficient only to support the weight of the pin 112 and retain it lightly in contact with the shutter operating crank or lever (not shown).

At the other end of the device, the end is attached to the flash gun or other means of operation. A pulley 84 is provided with means such as a screw 101 for attaching the cable 99 to the pulley. Spring 85 provides a thrust on pulley 84 in the direction indicated by the arrow 85', while spring 109 exerts its thrust on washer 108' tending to force plunger 137 toward the operative tip of the fitting or away from the sheathing 105. It can now be seen that the cable 99 is subjected to opposing spring tension of springs 85 and 109 and that any slack or relative difference of length existing between cable and sheathing as a result of flexing will be compensated within the sheathing. It can also be understood that if the spring tension of spring 85 exceeds that of spring 109 this slack will be absorbed by pulley 84 which will rotate slightly in either direction to absorb from or supply to the sheathing and cable the required compensation. The sliding member or plunger 137 will remain in the "drawn in" position shown in Fig. 3 until released by the camming action of plunger 134 as it is advanced toward the shoulder 122.

The cylindrical shaft 38 is a stationary member of a flash gun or other equivalent means. It is mounted cenrally between frame members 9 and 10 of the flash gun or the like. Hub 50 is a portion of a rotative mechanism of the gun and it is journaled over stationary shaft 38. Disk 49 is keyed to hub 50 and held in position by nut 51. The stationary plate 80 is journaled about hub 50 on its inner diameter while the outer diameter is keyed to the frame strips or members 9 and 10. This plate also is provided with a semi-circular slot 83 located as shown in Fig. 8. The stud 82 is riveted to plate 49 and extends into slot 83. It can now be seen that hub 50 will be limited in its rotation over or about shaft 38 to the range of the slot 83 or to substantially 180°. The hub 50 is subjected to spring tension urging it in the direction of arrow 49' for operating the gun. The gun is wound or loaded by turning the knob 8 in the direction indicated by the arrow 8' and is retained in loaded position by ratchet mechanism (not shown) until a release button also not shown is operated.

In respect to the operation of the cable device it is necessary to note only that hub 50 oscillates through 180° and that the loaded or wound position is with stud 82 in position 83$^b$ and that the unwound position is with stud 82 at 83$^a$. Fig. 8 shows the hub 50 in mid-position, so that, it could be shown in section in Fig. 11. Plate 87 is keyed to frame members 9 and 10 in the same manner as described for plate 80. The central portion of this plate is removed as indicated at 97 and 97' to provide a guiding surface for cam tip 93 of pawl 92. The pulley 84 with the ratchet 88 attached to it by rivets 84$^a$ is journaled about hub 50. The spring 85 is keyed to pulley 84 by an extension of rivet 84$^a$. The outer end of spring 85 is keyed to plate 49 by pin 80$^a$ and the tension of this spring is such as to cause pulley 84 to absorb all cable slack and hold release member 135 in the retracted position shown in Fig. 3, at all times except when acted upon by the pawl 92. Disk 90 is movable on hub 50 and is provided with a set screw 91 in the hub portion thereof and serves to key this member or disk 90 to the hub 50 in a regulatable angular relation. Pawl 92 is pivoted on the disk 90 by rivet 89$^a$. This pawl has a laterally projecting cam tip 93 extending upwardly into engagement with the inner surfaces 97 and 97' of plate 87. The spring 95 thrusts the pawl tip 89 toward engagement with ratchet teeth 88. The surfaces 97 and 97' are radially equidistant from the central shaft 38 and are of such proportions that cam 93 will hold the pawl tip 89 out of engagement with ratchet 88 while it is riding over surface 97' but will provide for engagement while on surface 97. The spring which operates the hub 50 in the direction of the arrow 49' is sufficiently strong to operate the flash gun generator and overcome the thrust of spring 85 actuating the pulley 84.

When the flash gun has been operated the stud 82 is in position 83$^a$. To re-operate it the large knob 8 is rotated 180° in the direction of arrow 8' or counter to 49'. During this winding or loading operation the pawl 92 is rotated counter clockwise from position 92$^b$ to 92$^a$. The tip 89 moves over the ratchet teeth but does not engage them. When fully wound the pawl is again off the ratchet as shown at 92 so that the pulley is again free to regulate the cable until the instant of operating the device. The flash gun is now operated by pressing a release button not shown which releases the hub 50 which is under spring tension and then the hub 50 moves rapidly through the range of slot 83 in the direction of the arrow 49'. The disk 90 moves with hub 50 and consequently pawl 92 rotates clockwise as indicated in Fig. 9 from position 92$^a$ to 92$^b$. The pawl tip 89 engages the ratchet 88 when the cam 93 is in position 93$^a$ and remains in contact with the ratchet for the angular contact duration of surface 96 on the cam 93. During the period of engagement of pawl 92 and ratchet 88 pulley 84 is rotated counter to the thrust of the spring 85 and spring 109 is free during this period to push sliding plunger or member 137 upwards toward the lateral projections 127 and 128 and as it strikes these projections it forces them inwardly until the upper edges slide off the shoulder 122 thereby releasing spring 126 to force the rod 110 upwardly to actuate the pin 112.

The tension of spring 111 is sufficient only to support the weight of pin 112 consequently when the fitting is screwed into the shutter of the camera, the camera shutter lever forces pin 112 inwardly against the very light tension of spring 111. The pin is forced outwardly again when the cable device is operated and the rod 110 is forced upwardly. The pin 112 and spring 111 may be regarded merely as a cushioning device and may be dispensed with in some cases.

The cable 99 is thus always under tension, and when through the action of the pawl 89 and the ratchet 88 the cable is released from the tension of the spring 85, the spring 109 moves the cable to shutter-release position. With this arrangement, wherein the cable is always under tension, and in which the movement to shutter-release position is effected by action of a spring adjacent the end of the cable, there is no variation in the time regardless of whether the cable is straight or curved.

From the foregoing description of the embodiment of the invention illustrated in the drawing, it will be apparent to those skilled in the art that by this invention there is provided a cable release that is constant in operation regardless of curvatures and that does not transmit shock to the camera.

It can now be readily understood that I have produced a spring controlled system for a cable in which the cable is constantly under tension and thereby preventing the accumulation of slack in the cable at any time. The controlled system includes three principal and distinct springs without including the cushion spring 111. The volute spring 85 is mounted in a housing which constitutes a portion of the flash gun casing. The volute spring is connected to the pulley 84 and when this volute spring is under its heavier tension it assists the spring 109 in compressing the spring 126 and thereby restores the slidable plunger element 134 to an initial position as shown in Fig. 3. The elements 110 and 134 are slidably united for limited movement whereby the plunger element 134 in combination with the springs 129 and 130 can force the spring 126 in a reset position and thereby utilizing the shoulder 122 and the lateral projections 127 and 128 of springs 129 and 130. At this juncture it can be observed that the spring 126 positively actuates the camera shutter when the springs 129 and 130 are released from the shoulder 122. This arrangement maintains substantially constant initial position for the combined plunger elements 110 and 134. When the pulley 84 and the spring 85 are released then the spring 109 actuates the plunger element 134 to engage the lateral projections 127 and 128 and thereby release the rod 110 which is propelled to actuate the pin 112 and consequently the camera shutter. If for any reason the cable 99 should require adjustment it can be made at the screw threaded connection between the threaded piece 108 and the internally threaded nipple 137.

It will be obvious that various changes may be made by those skilled in the art in the details of the embodiment of the invention illustrated in the drawing and described in detail above within the principle and scope of the invention as expressed in the appended claims.

I claim:

1. A camera shutter control means comprising a flexible sheathing having a flexible cable therein, in combination with three principal springs and a plunger, said plunger comprising slidably connected plunger elements including means to limit the sliding movement of said elements, in further combination with auxiliary release springs on one of said plunger elements, one of said principal springs comprising a volute spring located in a housing and connected through the medium of a pulley directly to one end of the cable, the other end of the cable being connected directly to the other slidable element of said plunger, another of said principal springs being centered around one plunger element and exerting elongated tension on its surrounding element, said other principal spring comprising a flexible helical compression spring located within the sheathing and surrounding the flexible cable, said flexible spring being arranged to actuate the cable and the other slidable element of the plunger when sufficiently released by the release of the volute spring.

2. In a camera shutter control means comprising a flexible sheathing having a flexible cable therein, in combination with a tubular casing directly connected to said sheathing, a pulley within a housing, said cable being directly connected at one of its ends to said pulley and the opposite end of the cable being connected directly to a plunger located within the tubular casing, in further combination with three principal controlled springs which are combined structurally to maintain the cable in a taut condition within the sheathing, one of said principal springs comprising a volute spring connected directly to the pulley for actuating the same and the cable connected thereto, another of said principal springs being centered around one element of said plunger and exerting an elongating tension thereon for actuating the camera shutter, said plunger comprising slidably connected elements provided with means therein to produce limited movement between said elements, in further combination with auxiliary release springs connected directly to one of said plunger elements, said other plunger element having means thereon to release the auxiliary springs and thereby provide for the actuation of the camera shutter, the remaining principal spring being a helical flexible construction located within the sheathing and surrounding the cable therein, said last named principal spring exerting pressure on one of said slidable plunger elements and actuating said element when sufficiently released from the tension created by the volute spring.

3. In a camera shutter control means comprising a flexible sheathing connected at one of its ends to a tubular casing and at its opposite end to a support adjacent a cylindrical housing, the substructure comprising a tubular casing containing slidably related plunger elements therein, said casing also containing therein an additional tube including a flanged end portion and an intermediate shoulder portion, said flanged end portion being directly connected to said tubular casing and a nipple by a flanged nut, one of said plunger elements having a disk on one end thereof arranged in an opposed relation to said shoulder, a compression spring centered about said element and resting on said shoulder at one of its ends and exerting pressure on the disk at its other end, said element also being provided with auxiliary release springs, said release springs having lateral projections adapted to releasably engage said shoulder, the other plunger element being hollow and provided with means to releasably disengage the auxiliary springs from said shoulder.

4. The construction set forth in claim 3 in which one end of the tubular casing is provided with a threaded nipple forming a guide for a slidable pin, said pin having a head thereon within the casing and located in opposed relation to the disk in combination with a light cushioning spring located between said head and said disk whereby said pin is maintained in light physical contact with the camera shutter lever.

5. In a camera shutter control means, said means comprising a flexible sheathing having a flexible cable therein, in combination with a tubular casing, a housing and a pulley, in further combination with three co-operative principal springs and a plunger comprising slidably related plunger elements, said elements being connected to provide for limited sliding movement, one of said principal springs being located in the housing and being directly connected with a control means including the pulley also located in said housing, one end of said cable being directly connected to said control means within said housing, the other end of said cable being connected to one of said plunger elements, a second principal spring being centered around said plunger element, said last named plunger element having an apertured disk riveted thereto, an additional tubular member located in said tubular casing and surrounding said plunger element, said tubular member having a shoulder located intermediate the ends thereof and an outturned flange on one of its ends whereby said tubular member may be directly connected to said tubular casing by a flanged nut, said second named principal spring being located between said shoulder and said disk and being biased against both said shoulder and said disk, one of said plunger elements having auxiliary latch springs secured thereto and biased away from said plunger element and adapted to detachably engage said shoulder, said other plunger element being located in the path of said auxiliary springs and said last named element being adapted to disengage said auxiliary springs from said shoulder, said remaining principal spring being located in said sheathing and surrounding said cable, said remaining principal spring being biased toward one plunger element and adapted to actuate the same when the tension on the first named principal spring is sufficiently relaxed.

6. In a camera shutter control means, comprising a flexible sheathing having a flexible cable therein, a tubular casing, a housing and a pulley, in combination with three principal springs and a plunger, said plunger comprising slidably connected plunger elements including means to limit the sliding movement of said elements, one plunger element being solid and the other hollow, in further combination with auxiliary release springs on said solid plunger element, one of said principal springs being located in the housing and connected through the medium of the pulley directly to one end of said cable, the other end of said cable being connected directly to the hollow plunger element, another of said principal springs being centered around the solid plunger element and exerting elongating tension thereon, said remaining principal spring comprising a flexible helical compression spring located within the sheathing and surrounding the flexible cable, said remaining spring being arranged to actuate the cable and the hollow plunger element when sufficiently released by the release of the first named spring in the housing.

7. In a camera shutter control means comprising a flexible sheathing having a flexible cable therein, a housing, a pulley, a tubular casing, slidably connected plunger elements and three principal springs, one of said plunger elements being hollow and the other being solid, one end of said cable being connected directly to the periphery of said pulley and the other end of said cable being directly connected to said hollow plunger element, one of said principal springs being connected with said pulley and constituting a control means for said pulley and cable, a second principal spring being located within the tubular casing and surrounding the solid plunger element, said tubular casing having a tubular member therein, said tubular member having a shoulder located intermediate its ends and an outturned flange at one of its ends whereby said member may be connected to said tubular casing by suitable means, said solid plunger element having an apertured disk riveted to one of its ends, said second named spring engaging said disk and shoulder and urging said solid plunger element toward shutter actuating position, said solid plunger element having two auxiliary leaf springs connected thereto at one pair of their ends, the free ends of said leaf springs being provided with outwardly extending projections adapted to releasably engage said shoulder and retain said solid plunger element retracted until said projections are released from said shoulder, the remaining principal spring being flexible and compressible and being located in said sheathing and surrounding said cable, said flexible sheathing having an internal shoulder therein intermediate its ends, said remaining spring resting at one of its ends against said internal shoulder and its opposite end being urged into tension relation against said hollow plunger element whereby when said first named spring and pulley are sufficiently relaxed then the remaining spring will propel the hollow plunger element to release the auxiliary leaf springs from the shoulder of the tubular member.

8. In a camera shutter control means, said means comprising a flexible sheathing having a flexible cable therein, the substructure comprising a tubular casing having a tubular member therein, said tubular member having a shoulder located transversely thereof and intermediate the ends thereof, one end of said tubular member being free and arranged concentrically in said tubular casing, the opposite end of said tubular member being provided with an outturned flange, in combination with a flanged nipple whereby both said member and said nipple may be secured to said tubular casing by a flanged nut, said tubular casing having a plunger therein, said plunger comprising plunger elements slidably connected together for limited movement, one of said elements being solid and the other being hollow, in combination with an apertured disk riveted to the free end of said solid plunger element, a helical compression spring centered about the free end of said tubular member and engaging the disk at one of its ends and the opposite end thereof engaging said shoulder, said solid plunger element having a pair of leaf springs riveted thereto said leaf springs having projections thereon and extending outwardly therefrom to releasably engage said shoulder, and thereby retain said solid plunger element under control until said projections are released from said shoulder, said hollow plunger element being located in the path of said leaf springs and when propelled against said leaf springs they will be simultaneously released from engagement with said shoulder.

STANLEY A. RUSSELL.

REFERENCES CITED

The following references are of record in the file of this patent:

UNITED STATES PATENTS

| Number | Name | Date |
|---|---|---|
| 1,214,700 | Marks | Feb. 6, 1917 |
| 1,467,218 | Wilmoth | Sept. 6, 1923 |
| 1,472,786 | Berggren | Nov. 6, 1923 |
| 1,709,039 | Poirmeur | Apr. 16, 1929 |
| 2,232,452 | Harmon | Feb. 18, 1941 |
| 2,328,831 | Mendelsohn | Sept. 7, 1943 |

FOREIGN PATENTS

| Number | Country | Date |
|---|---|---|
| 623,151 | Germany | Aug. 13, 1932 |